April 3, 1934.  S. SORESCU ET AL  1,953,442
LIFTING AND TURNING DEVICE
Filed Dec. 5, 1930
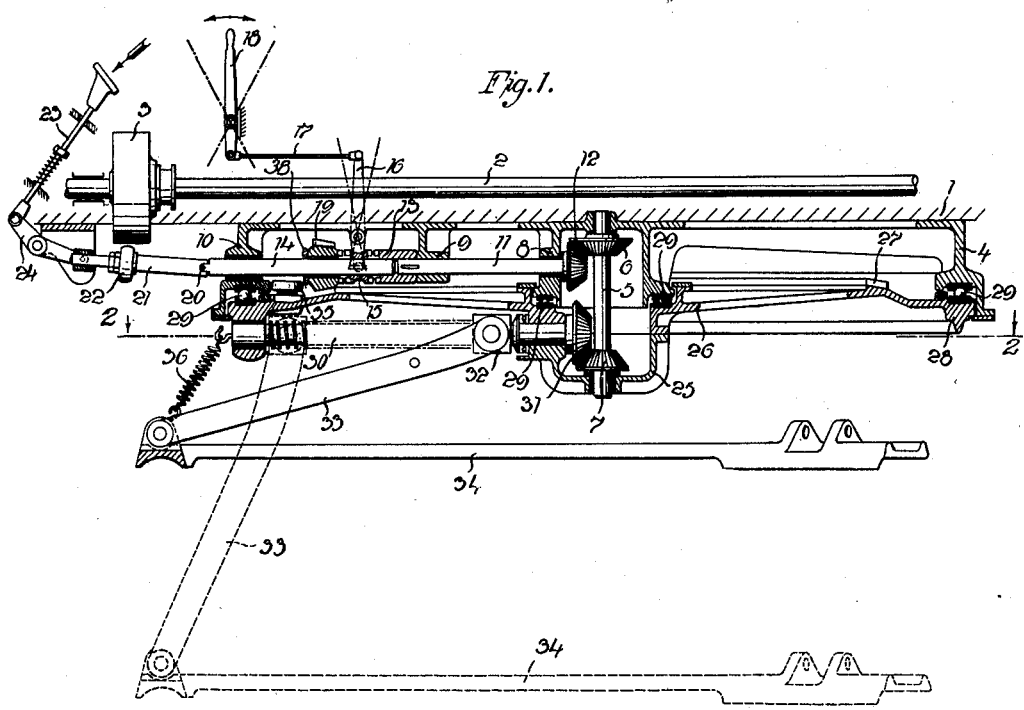

Patented Apr. 3, 1934

1,953,442

UNITED STATES PATENT OFFICE 1,953,442

LIFTING AND TURNING DEVICE

Sabin Sorescu and Maximilian Donath, Prague, and Hugo Trauschka, Mahr.-Ostrau-Witkowitz, Czechoslovakia Application December 5, 1930, Serial No. 500,318
In Czechoslovakia June 20, 1930

6 Claims. (Cl. 254—87)

The present invention relates to a raising and turning device for vehicles.

It is often necessary to raise vehicles, and particularly motor cars, in order to carry out repairs or change tires. Furthermore, the turning of vehicles in narrow streets is very difficult and, in case of long trucks, impossible, thus compelling them to turn on wide streets or squares.

The invention eliminates these difficulties by providing the chassis of the vehicle with a supporting bracket having movable arms by means of which the vehicle is raised. When in raised position, the vehicle can be turned about the central axis of the support on a plate center connected with the latter into the direction desired. Raising, turning and lowering the vehicle is effected by its motor, but the device is suitable not only for motor vehicles but it may be used in connection with railroad cars, locomotives, and the like. Moreover, a drive may be effected by special appliances by means of electricity or steam or by hand instead of by the motor of the vehicle.

One form of the invention is illustrated in the accompanying drawing, in which Figure 1 is a longitudinal section and partial view of the device; Fig. 2, a top view of the supporting bracket along the line 2—2, Fig. 1; and Fig. 3 is a side view of a motor vehicle showing the device folded in dotted lines and extended in full lines.

Referring to the drawing, to the chassis 1 of a motor vehicle a carrying ring 4 is secured below the cardan shaft 2 carrying the flywheel 3, and in the approximate center of the ring 4 a vertical shaft 5 is positioned which carries the bevel gears 6 and 7 near its ends. The carrying ring 4 is further provided with the three bearings 8, 9 and 10 for the driving shaft 11 whose free inner end is connected with a bevel gear 12 engaging the bevel gear 6. The other free end of the shaft 11 is fitted with a keyed sleeve 13 serving as a coupling jaw. In the bearing 10 a second shaft 14 is disposed which is coaxial with the shaft 11, moves freely in the coupling sleeve 13, and has a displaceable non-rotatable coupling disc 15 adapted to be displaced axially by means of the lever 16, link 17, and the handle 18. The shaft 14 also carries a rotatably mounted bevel wheel 19 provided with a coupling jaw so that the coupling disc 15 which is keyed on to the shaft 14 can be coupled by means of the sleeve 13 either with the shaft 11, or with the bevel gear 19. By means of a universal joint 20 the shaft 14 is connected with a shaft 21 carrying a friction disc or wheel 22 which, by means of the treadle 23 and the double-armed lever 24, can be pressed against the flywheel 3, the motion of which is thus transmitted to the coupling disc 15 which, according to its displacement and engagement with the sleeve 13 or the gear 19, rotates the shaft 11 or the gear 19. The gear 19 is held from movement to the left when engaged by the disc 15 by a washer ring 38 securely mounted on the shaft 14.

The vertical shaft 5 is positioned in the casing 25 of a plate supporting ring 26 provided with a wheel rim 27 engaged by the bevel gear 19 which rotates on the rim 27 when the latter is in motion. The edge 28 of the supporting ring 26, by means of the ball bearing 29, is maintained in position relative to the edge of the carrying ring 4 which can thus turn on the plate support 26 thereby acting as a turntable for the vehicle.

In the boss of the support 26 screw threaded shafts 30 are disposed, the preferred embodiment employing three centrally extending shafts as shown in Fig. 2. Each inner free end of the shafts 30 is provided with a bevel gear 31 which engage one another and the bevel gear 7 of the vertical shaft 5.

Each shaft 30 carries a nut 32 adapted to be displaced longitudinally during the rotation of the shafts 30. The nuts 32 are articulated to the arms 33 which are articulated to the base 34, and a displacement of the nuts 32 causes the arms 33 to move and thus lower or raise the base 34. Fig. 1 shows in solid lines the base 34 in highest or folded position while the dotted lines indicate its lowest or unfolded position.

The arms 33 together with the base 34 form a supporting bracket which causes the vehicle to be lifted when the bracket is lowered. The vehicle thus lifted is lowered again by moving up the arms 33 (Fig. 3).

Outside the rim 27 of the plate support 26 horizontal rollers 35 are arranged which are maintained in position relative to the edge of the carrying ring 4 and thus prevent lateral displacement of the plate support 26. When the vehicle is turned about the vertical shaft 5, these rolls 35 move over the edge of the ring 4.

The base is connected with the plate support 26 by means of the spiral springs 36 so that the upward displacement of the base 34 is assisted by the action of these springs 36.

The device functions as follows:

If the vehicle is to be lifted, the hand lever 18 is turned to the right or towards the driver so that the coupling disc 15 is in engagement with the sleeve 13 of the shaft 11. By pressing the treadle 23 the friction disc 22 is brought into engagement with the flywheel 3, and the motion of the shafts 21 and 14 is directly transmitted to the shaft 11. The bevel gear 12 will then move the bevel gear 6 whereby the bevel gear 7 will be rotated and caused to transmit its motion to the three bevel gears 31 so that the shafts 30 will rotate about their longitudinal axis and effect a displacement of the nuts 32 and bring about the angular position of the arms 33. This angular position is maintained until the arms 33 reach the position indicated by dotted lines in Fig. 1 when the base 34 will be lowered sufficiently to raise the car (Fig. 4).

All wheels of the vehicle are thus raised from the ground and can be readily exchanged, and the vehicle itself is lifted high enough to facilitate repairs.

If the vehicle is to be turned into another direction, it is only necessary to move the hand lever 18 in a direction opposite to the one described, i. e., in the direction leading to the treadle 23 so that the coupling disc 15 engages with the gear 19. When the treadle 23 is actuated, the motion of the friction disc 22 is transmitted to the gear 19 which moves over the rim 27 of the plate support 26 so that the raised vehicle can turn about the vertical shaft 5, the direction of rotation being determined by shifting the gears to reversing or forward motion. In this way the vehicle can be brought into the desired direction without moving it forward or backward and even a very long vehicle can be turned 180° in a narrow street.

If the vehicle is to be lowered again, the direction of rotation of the flywheel 3 is reversed and the coupling disc 15 is coupled with the sleeve 13. The arms 33 will then move towards the center of the vehicle and into the position indicated by solid lines by means of the shaft 5, the bevel gears 7 and 31 and the nuts 32 so that the supporting bracket or the base 34 will be raised involving a corresponding lowering of the vehicle.

The base 34 must be raised high enough to be out of contact with impediments on the road.

If the device is employed in connection with railroad cars, locomotives driven by steam or electricity, and the like, the base 34 must be constructed so as to be supported by the rails only. The base 34 would not form a frame, but would comprise a number of short feet before or behind the wheels, and the bearing surfaces of the feet would correspond to the rail heads.

This simple device makes it therefore possible to raise any vehicle by the power of the driving motor and to move it into the desired direction when in raised position so that a turning can be effected in a rapid and simple way even on narrow roads. In case of heavy trucks without motor power raising and lowering can be effected also by a hand drive and corresponding gearing.

We claim:—

1. A lifting and turning device for vehicles comprising a carrying ring secured to a frame of the vehicle; a supporting ring rotatably mounted on the carrying ring; a hub casing for each ring, the hub casing of the supporting ring being rotatable on the hub casing of the carrying ring; a vertical shaft rotatably mounted in the hub casings; a plurality of screw-threaded shafts rotatably mounted in the supporting ring and its hub and each having a gear connection with the vertical shaft; an arm for each screw-threaded shaft having a nut pivotally mounted on one end and threaded on and around its respective screw-threaded shaft; a base to which the other ends of the arms are pivotally connected; and means in the carrying ring geared to the vertical shaft to rotate the screw-threaded shafts and raise and lower the vehicle when the base contacts the ground.

2. A lifting and turning device according to claim 1, in which means is provided on the supporting ring and the means in the carrying ring to rotate the vehicle when in the raised position.

3. A lifting and turning device according to claim 1, in which the means is in the form of a shaft and having a gear thereon to rotate the vehicle when in the raised position.

4. A lifting and turning device according to claim 1, in which the means is in the form of a shaft and having a gear thereon to rotate the vehicle when in the raised position, and in which a clutch is provided on the shaft to selectively transmit rotation to the vertical shaft or to the gear to rotate the vehicle.

5. A lifting and turning device for vehicles comprising a carrying ring secured to a frame of the vehicle; a supporting ring rotatably mounted on the carrying ring; a hub casing for each ring, the hub casing of the supporting ring being rotatable on the hub casing of the carrying ring; a vertical shaft rotatably mounted in the hub casings; a plurality of screw-threaded shafts rotatably mounted in the supporting ring and its hub and each having a gear connection with the vertical shaft; an arm for each screw-threaded shaft having a nut pivotally mounted on one end and threaded on and around its respective screw-threaded shaft; a base to which the other ends of the arms are pivotally connected; a pair of coaxially arranged shafts rotatably mounted in the carrying ring and one thereof being geared to the vertical shaft; and means for transmitting power to the vertical shaft to raise the vehicle by connecting the two coaxial shafts together and to the supporting ring to rotate the vehicle when in the raised position by disconnecting the connection between the two coaxial shafts so that the other shaft thereof will transmit power to the supporting ring.

6. A lifting and turning device according to claim 5, in which the means includes a clutch on one of the pair of shafts.

SABIN SORESCU.
MAXIMILIAN DONATH.
ING. HUGO TRAUSCHKA.